(12) United States Patent
Fowler

(10) Patent No.: US 7,995,922 B2
(45) Date of Patent: Aug. 9, 2011

(54) WAVE DIVISION MULTIPLEXING REPLACEMENT OF SERIALIZATION

(75) Inventor: Michael L. Fowler, Scarborough, ME (US)

(73) Assignee: Fairchild Semiconductor Corporation, South Portland, ME (US)

( * ) Notice: Subject to any disclaimer, the term of this patent is extended or adjusted under 35 U.S.C. 154(b) by 990 days.

(21) Appl. No.: 11/830,353

(22) Filed: Jul. 30, 2007

(65) Prior Publication Data
US 2010/0027999 A1    Feb. 4, 2010

(51) Int. Cl.
*H04J 14/02*    (2006.01)
(52) U.S. Cl. .............................. 398/82; 398/85; 398/164
(58) Field of Classification Search .............. 398/82–88, 398/98–99, 101, 154–156, 164, 169–170
See application file for complete search history.

(56) References Cited

U.S. PATENT DOCUMENTS

| | | | | |
|---|---|---|---|---|
| 6,624,766 B1 * | 9/2003 | Possley et al. | ................... | 341/69 |
| 6,885,794 B2 * | 4/2005 | Scheuer et al. | ................ | 385/39 |
| 7,218,806 B2 * | 5/2007 | Han et al. | ......................... | 385/24 |
| 7,272,277 B2 * | 9/2007 | Ruiz | ............................... | 385/24 |
| 2001/0030971 A1 * | 10/2001 | Moody | ......................... | 370/401 |
| 2003/0043426 A1 * | 3/2003 | Baker et al. | ................... | 359/109 |
| 2004/0081386 A1 * | 4/2004 | Morse et al. | .................... | 385/15 |
| 2006/0274419 A1 * | 12/2006 | Marshall et al. | .............. | 359/580 |
| 2008/0205437 A1 * | 8/2008 | Cole | ............................. | 370/464 |

OTHER PUBLICATIONS

Linnell Martinez and Michal Lipson, High confinement Suspended Micro-ring Resonators in Silicon-on-insulator, Department of Electrical and Computer Engineering, Cornell University, Ithaca, New York, Jun. 26, 2006.
APSS Apollo Application Note on Micro Ring Resonator, Computer-Aided Design and Simulation APN-APSS-Ring Resonator. Apollo Inc, Hamilton, Ontario (c) 2003.

* cited by examiner

*Primary Examiner* — Dzung D Tran
(74) *Attorney, Agent, or Firm* — Cesari and McKenna, LLP

(57) ABSTRACT

A WDM system is used to transfer bytes of data between keyboard, display and camera portions of a hand held device. The data signals are converted into light wavelengths via lasers or LEDs of differing wavelengths and transported over an optical fiber cable. Mems devices help direct the wavelengths to the optical cable and mems devices may be used at the receiving end. The receiver illustratively has a photodiode array to receive the different wavelengths and produce electronic signals. Optical filters and micro-ring resonators may be employed.

6 Claims, 4 Drawing Sheets

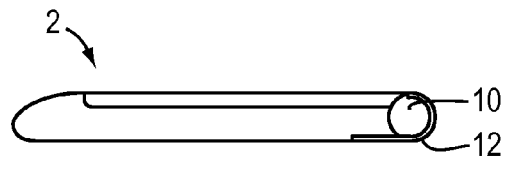
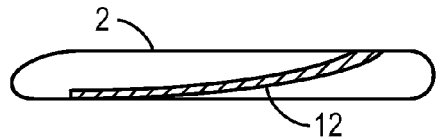
FIG. 1A
FIG. 1B
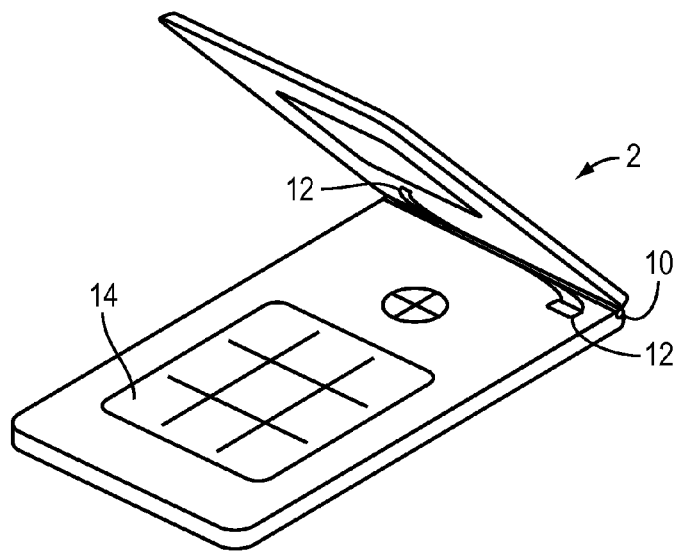
FIG. 1C
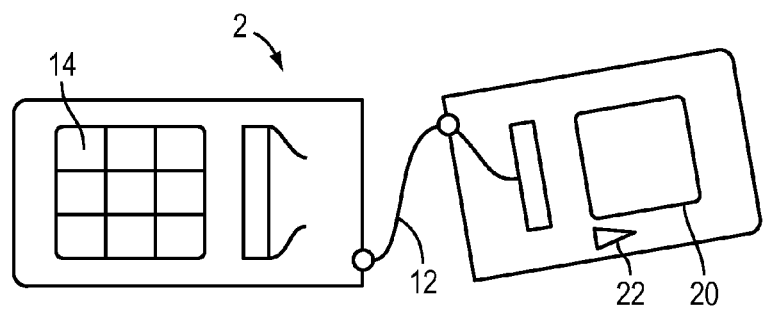
FIG. 2

WAVE DIVISION MULTIPLEXING REPLACEMENT OF SERIALIZATION

BACKGROUND OF THE INVENTION

1. Field of the Invention

The present application relates to optical data transmission, and more particularly to converting parallel electronic signals to optical signals and wavelength multiplexing those signals in parallel over optical fiber and converting back to parallel electronic signals.

2. Background Information

Transmitting parallel data over wire cables usually entails using many conductors (copper wires). In these cases, EMI (electromagnetic interference), ground loops, and reliability issues must be considered by designers. This is especially true where the wires comprise part of a hinge, e.g., in flip or clam shell type of cell phone, or "flip phone"). One approach to these issues has been to serialize the data and de-serialize it at the receiver. The number of wires in the cable is reduced, but timing and complex circuitry issues are introduced.

WDM (Wavelength Division Multiplexing) allows a number of different light wavelengths or frequencies or "colors" to be sent down a single optical fiber cable. Lasers provide a single wavelength signal and many such signals can travel in the same optical fiber with no interference with each other. Known system have transferred 100 or more simultaneous optical signals, each at a data rate of more than 10 gigabits per second, over a cable 250 miles long.

LEDS (light emitting diodes) output a narrow band of wavelengths that may be tens or more nanometers wide compared to less than 0.1 nanometers for lasers) that may also be multiplexed over an optical cable. The form factor of LEDs (smaller, using less power, more suitable for integration on a chip) may suggest their use for hand held mobile devices, e.g., cell phones.

There is a laser producing diode (ILD—injection-laser diode) that may be used in some applications.

WDM eliminates EMI, serialization/de-serialization, and employs a single optical fiber cable.

SUMMARY OF THE INVENTION

The present invention provides advantages of minimizing the size of data carrying cables, reducing electronic interference, increasing bandwidth capabilities, and overcoming timing issues related to serialization/de-serialization.

In illustrative applications where an optical cable carrying parallel data replaces electronic digital serialization-deserialization (SerDes) circuitry, data transmission speed and timing are significantly improved. In other illustrative embodiments, an optical cable transfers multiple bytes from a number of independent electronic ports (herein "byte" refers to two or more data bits) in parallel. In this example, the multiple bytes are asynchronous with respect to each other and exhibit independent different timing characteristics. For example one byte may emanate from a slow keypad port while another may come from a high speed video port. To be clear, one port outputs or inputs the parallel bits that make up a byte, followed in time by another byte. Some might refer to this timing as bit parallel, byte serial, for one port, wherein the invention includes sending and receiving bytes in parallel from two or more ports that are not related to each other. The terms "independent" and "not related to" are used interchangeably herein.

Illustrative embodiments of the present invention may be found in small environments like flip, slide and stationary cell phones, and in hand held personal electronic assistant/planners. In these environments, the optical fiber may be thin, single mode fibers that allow bending. In slide and static (one-piece) applications, the fiber may be larger and operate in multi-mode. In an illustrative application, an optical cable is capable of transferring parallel bytes or words (byte herein after refers to two or more data bits that are related to each other) from a number of independent electronic ports.

LEDs and/or lasers may be used in illustrative applications. The light frequencies from a number of sources, each representing a signal, may, illustratively, be directed via a microelectro mechanical system (mems) apparatus or via an integrated circuit optical layer to one end of an optical cable. The light signals are received and separated into the various wavelengths by optical assembly including optical filters. The receiving optical assembly may include mems devices, for example, a flat plane holographic diffraction grating may be useful to discriminate wavelengths in some applications. The discriminated wavelengths are converted, for example, by photodiodes into electrical signals.

Optical fibers have a number of benefits. The bandwidth is in the gigaHertz range, they are small, and electrostatic interference does not affect optical signals. The physical cable may be smaller and more reliable than a many conductor copper wire cable meant to carry parallel data.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which:

FIG. 1A is perspective view of a hand held portable device that folds;

FIG. 1B is a perspective view illustrating an optical communications cable between the two hinged parts of the device of FIG. 1A;

FIG. 1C is an isometric view of the device shown in FIGS. 1A and 1B;

FIG. 2 is schematic representation of the interconnections to the optical cable;

DETAILED DESCRIPTION OF AN ILLUSTRATIVE EMBODIMENT

Figure 3:
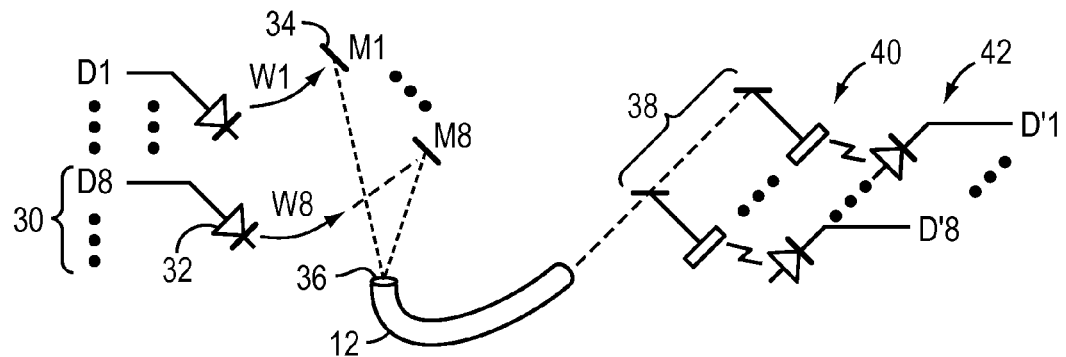
FIG. 3 is a schematic of the electronic to optical interface.

FIGS. 1A, 1B, 1C and 2 illustrate one application of the present invention. A "flip phone" 2 is shown with a hinge 10. The hinge includes a thin optical cable 12 that is arranged to allow the full range of motion needed to open and close the flip phone.

The optical cable may be arranged to carry the optical signals back and forth via an electronic/optical interface 16 traversing the hinge 10 between a keyboard 14 and a display screen 20 and camera 22. In the illustrative example, the optical cable 12 extends from one side of the device to the other and complies with the opening of the device by twisting to reduce the bending radius.

In a stationary phone or a hand held electronic personal assistant, the present application may dispense with the optical cable and simply run an optical layer interface, as discussed below.

FIG. 3 illustrates electronic signals 30 driving LED's 32. The light from the LEDs are arranged cover from the visible spectrum into the infrared. Wavelengths around 750 to 1800 nanometers allow a number of LEDs to be implemented where each LED represents a channel for one bit of data. Lasers may be used, replacing the LEDS, that would allow many more channels, since lasers provide essentially a single wavelength.

FIG. 3 may include mems mirrors 34, M1-M8, that are arranged to direct the LED light to the optical cable 12. At the receiving end a series of transmit/reflect prisms 38 allow the received light to be directed to filters 40 that discriminate the various wavelengths. The individual wavelengths are directed to, illustratively, a photo-diode array 42 that converts the light back into electronic signals. Note the optical cable may be used to send signal in either direction (not shown), so duplex communications may be used.

In practice either single or multi-mode optical cable may be used, but single mode is thinner and may be better suited to bending.

Figure 4:
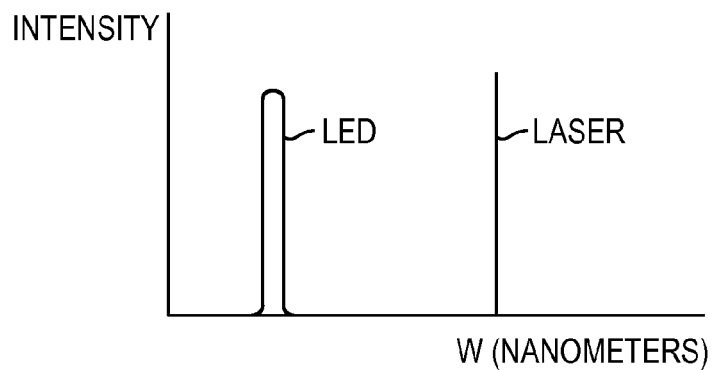
FIG. 4 is a schematic of the optical to electronic interface.

FIG. 4 represents relative wavelengths of an LED and a laser, not to scale.

Figure 5:
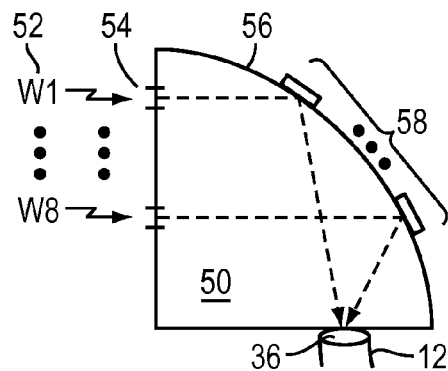
FIG. 5 is a representative grouping of signals on an optical cable.

FIG. 5 is a more detailed view of an illustrative embodiment. Here an integrated circuit 56 optical layer 50 is shown in a top view. Such layers are known in the art, see U.S. Pat. Pub. No. US2005/0095000A1, owned by IBM. This publication is incorporated herein by reference.

LED or laser wavelengths 52 are fed into the layer 50. Apertures 54 may be used in some applications to better direct and collimate the light. The mirrored section 56 is arranges so that the reflection of the light from each LED is directed to the input 36 of the optical cable 12. The reflective surface may be contoured or it may be a series of flat mirrored sections 58 each at an angle from each other in order to direct the light.

Figure 6A:
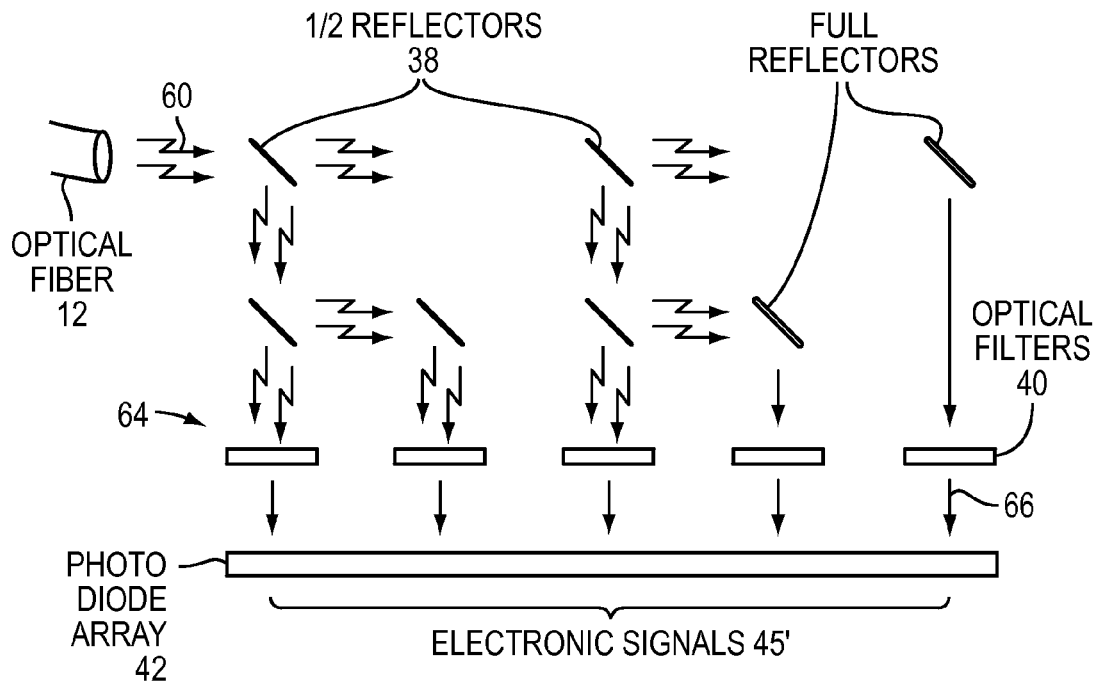
FIGS. 6A and 6B are an illustrative circuit organization of signals sent and received.

FIG. 6A shows the optical cable 12 emitting the light signals 60. In this illustrative example, the light is incident on half silvered mirrors 38 that are arranged to pass about half the light and reflect the other half. Each half silvered mirror produces two light beams, and in this example, a total of five light beams 64 are produced. Each of these beams 64 is incident onto an optical filter 40 that separates out only one of the light wavelengths. The filters may be interference types, but other types may be used to advantage. In some applications (cell phone) the distance traveled by the light is very short so the loss of intensity can be handled even though the light may be divided many times.

The light 66 exiting the optical filters 40 may be directed onto photodiodes, illustratively in a diode array 42. The photodiodes output electronic signals 45.

Figure 6B:
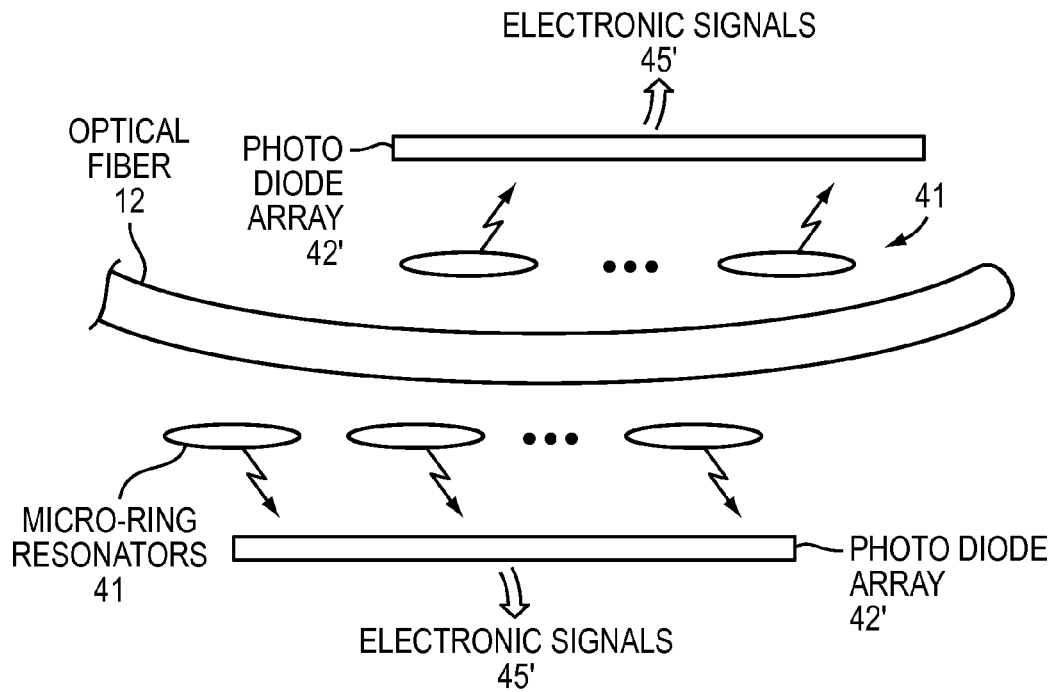

FIG. 6B illustrates another arrangement for extracting the individual light wavelengths from the optical fiber cable 12. Here micro-ring resonators 41 configured along the optical fiber 12 take individual light wavelengths that are directed onto photodiode arrays 42. The photodiode arrays output electronic signal 45 that can be used by the following electronic signals. Micro-ring resonators are described in U.S. Pat. No. 6,885,794 owned by Lambda Crossing, LTD. This patent is incorporated herein by reference.

Figures 7, 8:
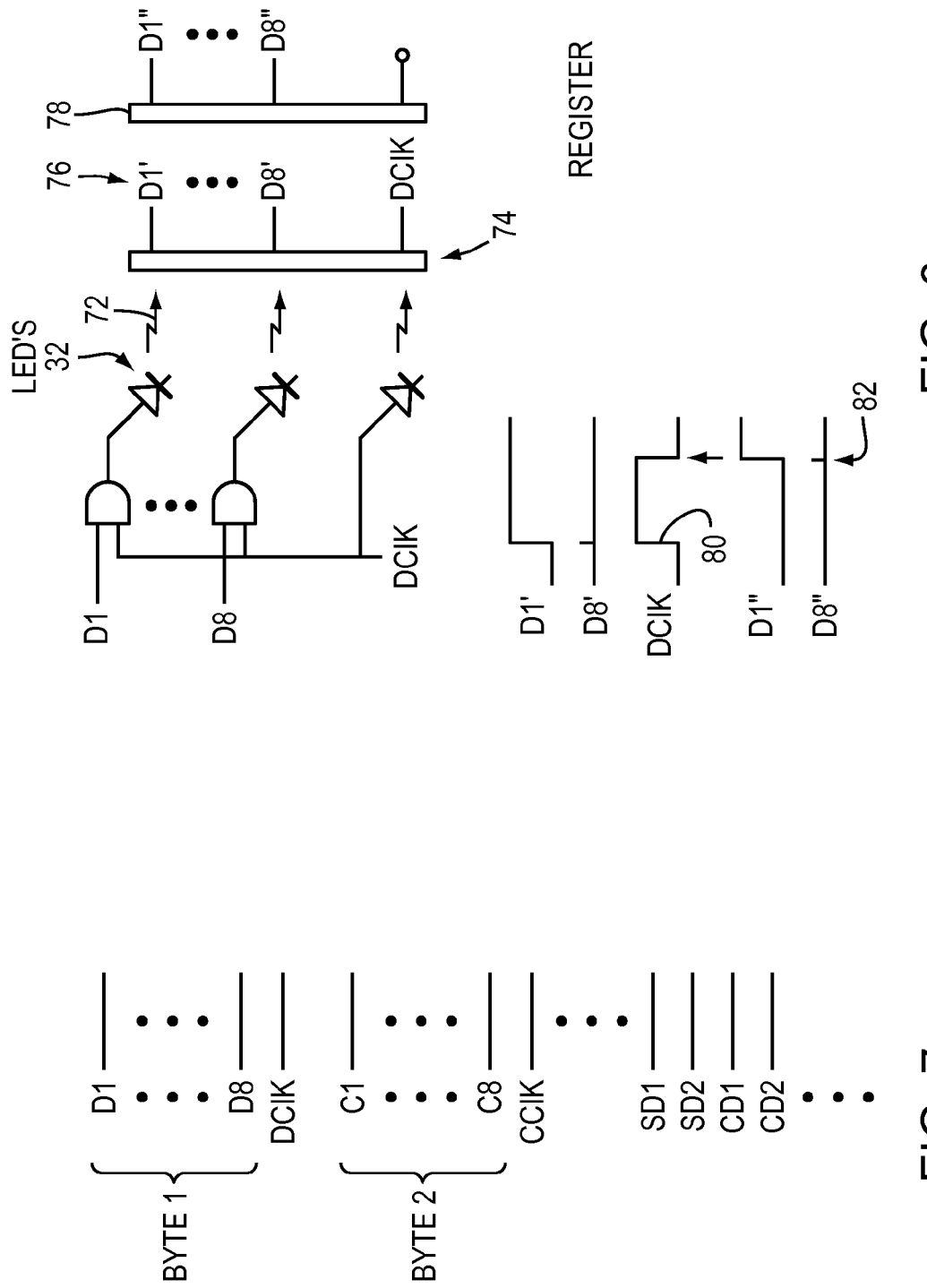
FIG. 7 illustrates an organization of parallel data bytes, serial data and control signals.
FIG. 8 illustrates a possible parallel data being sent and received optically and a timing diagram illustrating receipt of the parallel data.

FIG. 7 illustrates an organization of the parallel channels available on the optical fiber cable. Illustratively, nine light frequencies or channels are taken by sending a parallel byte 1, D1-D8, with a clock signal DCLK. The DCLK signal is arranged to provide an edge 80 that signifies that the data lines are stable and, for example, can be clocked into a register 78 at the receiver. Another group of channels carries byte 2, C1-C8 and a CCLK. Eight data bit byte are shown, but other bit widths may be used, e.g., 2, 4, 16, 64, etc. Moreover, other groups of parallel data may be transferred, and in addition other single channels may carry serial data, SD1, SD2-SDn, or control signals, CD1. In this example, the signals may or may not have any relevance to each other, they may be completely independent.

FIG. 8 illustrated eight data lines D1-D8 being enabled by the DCLK to drive the LEDs 70 sending the byte and the DCLK over the optical interface 72. Receiving optics 74 produce data D1'-D8' and the DCLK 76. These are fed to a register 78 where the timing diagram applies. At time 80, the positive going DCLK enables the data lines to drive the LEDs. At the receiving end timing the negative going DCLK 82 loads the now stable data into the register 78. The register 78 holds D1"-D8".

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A hand held electronic device having a first part and a second part joined by a hinge, the hinge defining a length from side to side of the hand held device, the hand held device comprising an optical transmission apparatus configured for carrying data, the apparatus comprising:

more than one light source of different wavelengths, wherein each wavelength carries a data stream of one bit, wherein the data streams of one bit are configured in parallel into bytes, wherein each byte comprises two or more bits, and wherein different ports, that are independent, wherein independent includes that the bytes from the different ports may be asynchronous or synchronous, send bytes in parallel with each other;

an optical cable with at least one optical fiber arranged to carry the different wavelengths;

an optical interface for directing the different wavelengths onto the optical cable;

an optical receiver for receiving the different wavelengths from the optical cable and distinguishing the different wavelengths from each other, mirrors arranged to intercept each wavelength and direct them to an end of and then into the optical cable, transmitting/reflecting mirrors at the distal end of the optical cable arranged to receive the wavelengths emitting from the optical cable, filters arranged to receive the wavelengths from the mirrors and distinguish the different wavelengths, and electronic devices that receive the distinguished wavelengths and convert the wavelengths to corresponding electronic signals.

2. The optical transmission apparatus of claim 1 further comprising:

a wavelength representing a clock signal traveling with a corresponding byte on the optical cable, wherein the clock signal indicates when the data bits of the byte are stable, the data transmission arranged in a bit parallel, byte serial fashion for each of the independent bytes.

3. The hand held device of claim 1 wherein the electronic devices that receive the distinguished wavelengths are photodiodes.

4. The hand held device of claim 1 wherein the optical receiver comprises micro-ring resonators that distinguishes and separates out the different light wavelengths.

5. The hand held device of claim 1 wherein the light sources are LEDs.

6. The hand held device of claim 1 wherein the light sources are lasers.

* * * * *